United States Patent
Artmann et al.

(10) Patent No.: US 6,651,860 B2
(45) Date of Patent: Nov. 25, 2003

(54) PERCUSSIVE STRIKING ELECTRIC TOOL DEVICE

(75) Inventors: Konrad Artmann, Worthsee (DE); Johann Augustin, München (DE); Martin Mayr, Ilmmünster (DE); Martin Richter, Freising (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/205,631

(22) Filed: Jul. 24, 2002

(65) Prior Publication Data

US 2003/0019645 A1 Jan. 30, 2003

(30) Foreign Application Priority Data

Jul. 30, 2001 (DE) .......................... 101 37 157

(51) Int. Cl.[7] ................................................ B25D 9/14
(52) U.S. Cl. ...................... 227/109; 227/117; 227/201; 227/216; 227/217; 310/50
(58) Field of Search .................. 173/109, 110, 173/112, 117, 201, 216, 217; 310/47, 50

(56) References Cited

U.S. PATENT DOCUMENTS

| | | | | |
|---|---|---|---|---|
| 2,949,909 A | * | 8/1960 | Mancchioni et al. | 173/117 |
| 3,718,193 A | * | 2/1973 | Wanner | 173/117 |
| 4,015,671 A | * | 4/1977 | Borisov et al. | 173/117 |
| 4,156,468 A | * | 5/1979 | Stiltz et al. | 173/118 |
| 4,353,425 A | * | 10/1982 | Simpson | 173/109 |
| 4,601,351 A | * | 7/1986 | Hartwig et al. | 173/117 |
| 4,609,053 A | * | 9/1986 | Ragnmark | 173/104 |
| 4,766,963 A | * | 8/1988 | Hartwig et al. | 173/109 |
| 6,044,918 A | * | 4/2000 | Noser et al. | 173/176 |
| 6,123,158 A | | 9/2000 | Steffen | |
| 6,216,798 B1 | * | 4/2001 | Riello et al. | 173/152 |

FOREIGN PATENT DOCUMENTS

| | | |
|---|---|---|
| DE | 4312328 | 10/1994 |
| DE | 9532976 | 3/1997 |
| EP | 0104154 | 3/1984 |
| EP | 0107628 | 5/1984 |
| EP | 0107629 | 5/1984 |
| EP | 0764502 | 3/1997 |
| FR | 0887542 | 11/1943 |

\* cited by examiner

*Primary Examiner*—Scott A. Smith
*Assistant Examiner*—Chukwurah Nathaniel
(74) *Attorney, Agent, or Firm*—Sidley Austin Brown & Wood, LLP

(57) ABSTRACT

An electric tool device (1) for an at least partially rotating and percussive striking driving mechanism with a pneumatic striking mechanism (2), which is driven over a gear assembly (9) by an electronically commutated electric motor (3) with an internal rotor (5) having poles (4) and an external stator (8), having field coils (7) connected with a DC-AC converter of control electronics (6), the power take-off side of the rotor shaft (10) being mounted in the gear assembly (9) and the driving end of the rotor shaft (10) with the freely protruding poles (4) engaging the stator (8), being introduced coaxially into the stator (8).

7 Claims, 2 Drawing Sheets

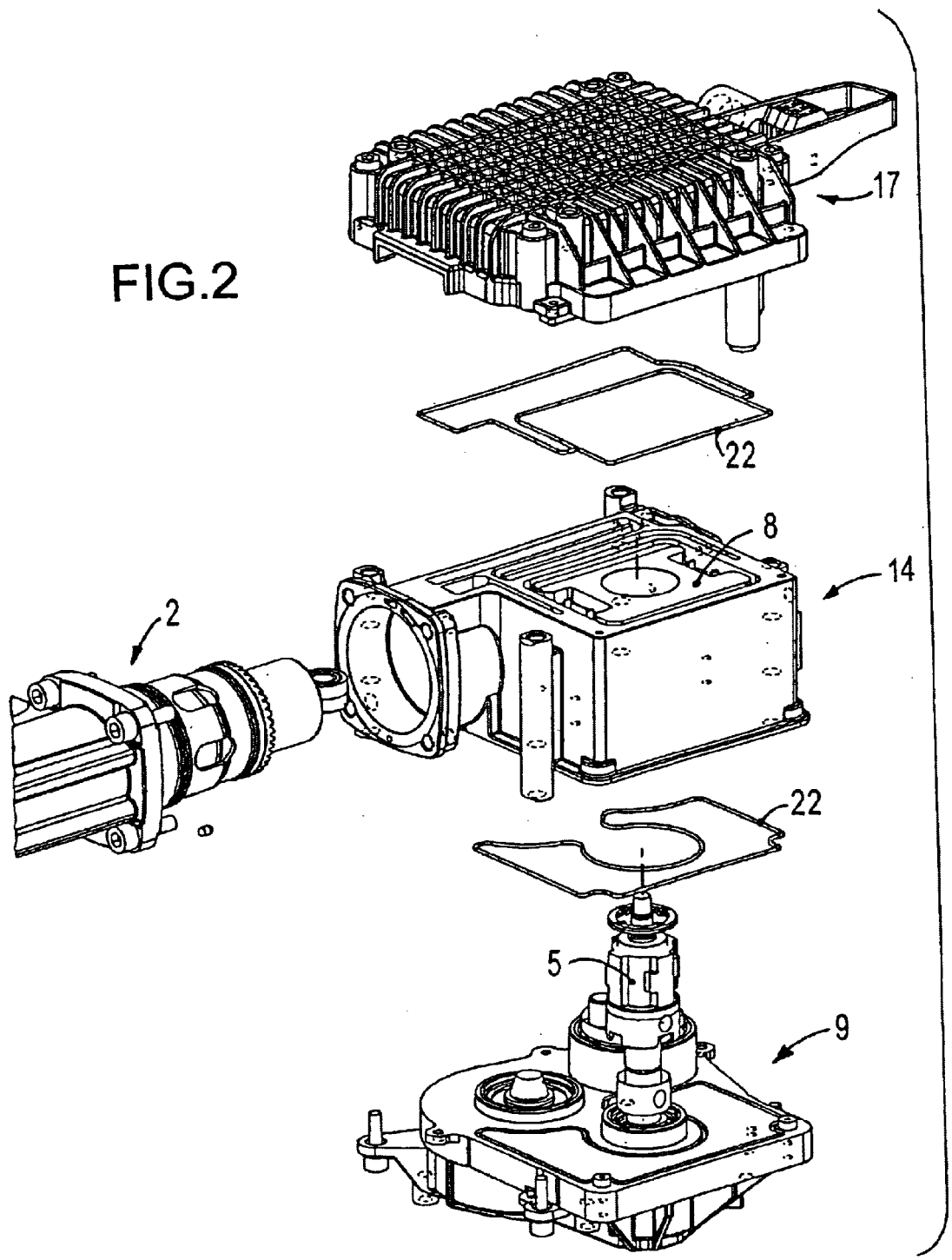

PERCUSSIVE STRIKING ELECTRIC TOOL DEVICE

FIELD OF INVENTION

The invention is directed to an at least partially rotating and percussive striking electric tool device such as a hammer drill or drilling chisel, especially for mining.

BACKGROUND INFORMATION AND PRIOR ART

Heavy drilling hammers, selectively supported at the face and having a weight of more than 10 kg, as normally used in underground mining for driving drilling tools with long drill rods and drill heads with a diameter of 20 mm to 50 mm for producing blasting holes, usually are driven pneumatically, in order to exclude the risk of an explosion due to electrical sparks. However, pneumatic driven devices are very bulky and cause high-energy losses due to the flow resistance in the long compressed air pipelines.

According to the DE 1060033, a manual drilling machine for mining has a brushless electric motor (induction motor with the characteristics of a motor with multi-rod rotors) as the driving mechanism. Mains frequency-driven, brushless electric motors are comparatively heavy. Usually, in the case of percussive striking electric tool devices, the heavy electric motor is mounted adjacent to the rotor shaft, which protrudes on the power take-off side and is subjected strongly to alternating loads.

According to U.S. Pat. No. 5,235,259, an electronically commutated electric motor is used to drive a drill rod and, according to the German patent 3417228, generally for the mechanical drive in underground mining.

According to the EP 107628, the electronically commutated electric motor of a hammer drill with a pneumatic striking mechanism disposed perpendicularly to the striking direction is constructed with a pot-shaped external rotor, which is fastened at the end to a protruding single point-supported rotor shaft, which is a component of the gear assembly. The bulky, pot-shaped external rotor of the electric motor must be mounted separately on the rotor shaft after the installation of the stator. The cam, protruding at the end, furthermore leads to high alternating stresses on the rotor shaft.

According to the EP 107629, a hammer drill of modular construction with a pneumatic striking mechanism has a brushless electric motor, electronically commutated over a DC-AC converter. The entire electric motor is a component of a motor assembly and a rotor, mounted to protrude on one side along the striking axis, engages the motor assembly after the installation of the modules with a protruding driving pinion. Accordingly, the gear assembly as such cannot be sealed against leakage of lubricant to the motor assembly. Moreover, the driving pinion, disposed so as to protrude from the end, leads to high alternating stresses on the rotor shaft.

OBJECT OF THE INVENTION

It is a primary object of the invention to provide a modular installable, percussive striking electric tool device of long service life, which can be highly stressed.

SUMMARY OF THE INVENTION

Essentially, an at least partly rotating and percussive striking electric tool device has a pneumatic striking mechanism, which is driven by an electronically commutated electric motor with an internal rotor, having poles, and an external stator, having field coils connected with a DC-AC converter of a control electronics, the rotor shaft being mounted at the power take-off side in a gear assembly and, at the driving end being introducible with the freely protruding poles, which engage the stator, coaxially into the stator.

Due to the separation of the brushless electric motor into a rotor, which can be pre-assembled with the gear assembly, and a stator, which can be pre-assembled with the motor assembly, the rotor and stator can be pre-assembled very easily, the electric motor being assembled appropriately only at the end of the installation of the gear assembly with the motor assembly by means of coaxially introducing the rotor into the stator. The gear assembly as such is already sealed after the pre-assembly by the rotor shaft against leakage of lubricant to the motor assembly.

Advantageously, a magnet ring, with a holding device having recesses and lugs in order to engage, in a precisely defined angular position and rotationally interlocking manner, lugs and recesses in the rotor, can be introduced at the power take-off end of the rotor non-rotationally and coaxially into the stator. The magnet ring is the rotating part of a sensor connected with the control electronics for measuring the rotor angle.

Furthermore, the gear assembly for driving the striking mechanism is disposed over a cam in a closed gear housing, which consists of a housing shell and an essentially flat housing lid, a module, tightly closed to prevent leakage of lubricant formed already for the pre-assembly.

Advantageously, the motor assembly with the stator is disposed in an essentially casing-shaped motor housing, which can be connected tightly, so as to prevent leakage of lubricant, adjacent to a wall of the gear housing. As a result, a coolant, flowing through the motor assembly and through the common wall of the gear housing, cools the motor assembly with the stator as well as the gear assembly.

Moreover, the electronic assembly with the DC-AC converter is disposed in a closed electronic housing, and preferably comprises a housing shell and an essentially flat housing lid and can be connected tightly, to prevent any escape of coolant, with the motor housing adjacent to a wall of the electronic housing. As a result, a coolant, flowing through the motor assembly through the common wall of the electronic housing, cools the motor assembly with the stator as well as the electronic assembly with the DC-AC converter and furthermore, an intermediate circular condenser, which can be plugged into and is in thermally conducting contact with the wall of the electronic housing. The motor connectors for contacting the field coils of the stator for supplying the alternating current controlled over the sensor signal are also a part of the wall of the electronic housing.

In a preferred manner, the motor housing, as well as the wall of the gear housing and the wall of the electronic housing are provided with a plurality of grooves and channels for conducting the coolant, which are assigned geometrically to one another and, after the final installation of the gear assembly with the motor assembly and the electronic assembly, form a coolant-tight, suitable cooling system, through which the coolant can flow in meandering fashion. As a result, especially the field coils, the DC-AC converter and the intermediate circular condenser as well as the striking mechanism in a continuation of the coolant flow, can be cooled in accordance with the cooling power required.

BRIEF DESCRIPTION OF THE DRAWING

The invention will be described in greater detail in connection with an advantageous example in which:

FIG. 2 is a partially exploded representation of the device in FIG. 1.

DETAILED DESCRIPTION OF THE INVENTION

Figure 1:
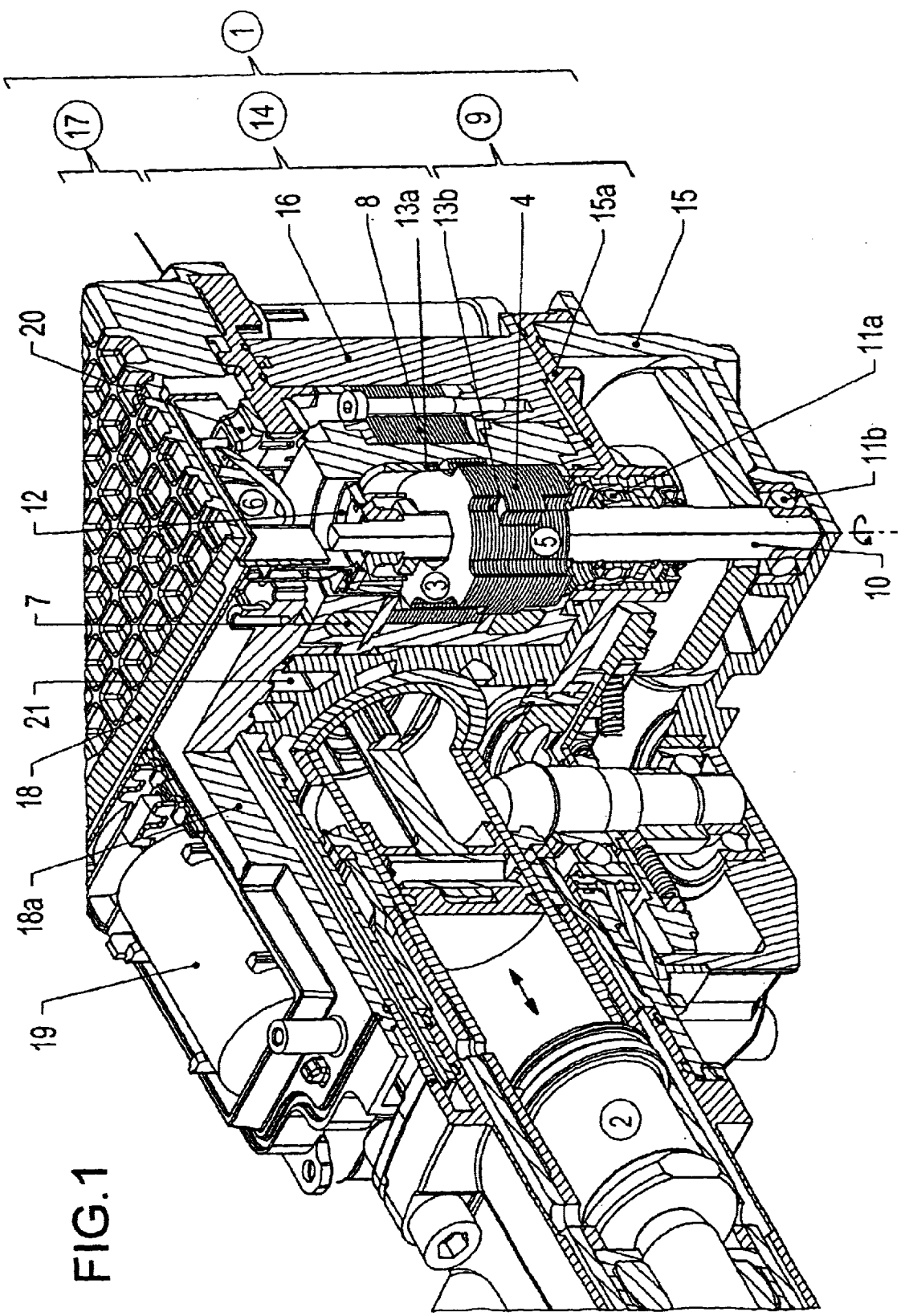
FIG. 1 is a partial sectional view through the electric tool device embodying the invention.

According to FIG. 1, an electric tool device 1, shown only partially, has a pneumatic striking mechanism 2, which is driven over a gear assembly 9 by an electronically commutated electric motor 3 with an internal rotor 5 having poles 4, and an external stator 8, having field coils 7 connected with a DC-AC converter of control electronics 6. The rotor shaft 10 is mounted on the power take-off side in two axially spaced ball bearings 11a, 11b in the gear assembly 9 and, at the driving end, is introduced coaxially into the stator 8 with the freely protruding poles 4, which engage the stator 8. At the driving end of the rotor 5, a magnet ring 12 is fastened, also introduced coaxially in the stator 8 as the rotating part of a sensor for measuring the rotor angle and connected with the control electronics. The magnet ring 12 has lugs 13a in its holding device, for engaging rotationally and in a pivotable manner recesses 13b of the rotor 5 in a precisely defined angular position. The gear assembly 9 is disposed in a closed gear housing 15, consisting of a housing shell and an essentially flat housing lid and from which the rotor 5 protrudes freely with the magnet ring 12. The motor assembly 14 with the stator 8, is disposed in an essentially casing-shaped motor housing 16, which is tightly connected with the gear housing 15 to prevent escape of coolant, and is disposed adjoining a wall 15a of the gear housing. An electronic assembly 17 with the DC-AC converter of the control electronics 6 is disposed in a closed electronic housing 18, and consists of a housing shell and an essentially flat housing lid and is connected tightly, to prevent escape of coolant, with a wall 18a of an electronic housing adjacent to the motor housing 16. At the same time, an intermediate circular condenser 19, which can be plugged in, lie in thermal conduction against the wall 18a of the electronic housing. The motor plugs 20 for contacting the field coils 7 of the stator 8 for the conductive connection to the DC-AC converter of the control electronics 6 are part of the wall 18a of the electronic housing. The motor housing 16, as well as, adjacent to the latter, the wall 15a of the gear housing and the wall 18a of the electronics housing, are provided with a plurality of grooves and channels 21, which are assigned geometrically to one another for conducting the coolant and form a coolant-tight meandering system, through which the coolant can flow.

According to FIG. 2, the final installation of the gear assembly 9, including the rotor 5 of the electric motor 3, already closed, lubricant-tight for the pre-installation, with the motor assembly 14, including the stator 8 of the electric motor 3 as well as the electronic assembly 17, already closed for the pre-assembly, is carried out in modular fashion, seals 22 are inserted on either side of the motor assembly 14 for the coolant-tight sealing of the channels 21 formed in between.

What is claimed is:

1. An electric tool device having an at least partially rotating and percussive striking driving mechanism including a pneumatic striking unit (2), driven over a gear assembly (9) by an electronically commutated electric motor (3) having an internal rotor (5) with freely protruding poles (4) and an external stator (8) having field coils (7) connected with a DC-AC converter of control electronic (6), said rotor (5) having a shaft (10) with a power take-off side mounted in said gear assembly (9) and a driving end of said shaft (10) and said freely protruding poles (4) engaging the stator (8), and introducible coaxially into the stator (8).

2. An electric tool device, as set for in claim 1, wherein a magnet ring (12), with at least one of recesses and lugs (13a), engageable with said rotor (5) in a defined angular position and in a rotationally interlocking manner, and is introducible on the power take-off side of said rotor (5) non-rotationally and coaxially into said stator (8).

3. An electric tool device, as set forth in claim 1, wherein said gear assembly (9) for driving said striking unit (2) is disposed in a closed gear housing (15) formed of a housing shell on a flat housing lid.

4. An electric tool device, as set forth in claim 3, wherein said electric motor (3) comprises a motor assembly (14) including said stator (8) is disposed in a casing-shaped motor housing (16) and an adjoining wall (15a) of said gear housing (15).

5. An electric tool device, as set forth in claim 4, wherein an electronic assembly (17) containing said DC-AC converter of said control electronics (6) is disposed in positioned in a closed electronic housing (18) formed of a housing shell and a flat housing lid.

6. An electric tool device, as set forth in claim 5, wherein said motor assembly (14) including said stator (8) is arranged in a casing-shaped motor housing (16) adjacent to a wall (18a) of said electronic assembly (17).

7. An electric tool device, as set forth in claim 6, wherein said motor housing (16) adjacent wall (15a) of said gear housing (15) and said wall (18a) of said electronic assembly (17) are provided with a plurality of grooves and channels (21) arranged geometrically to one another for conducting a flow of coolant therethrough.

* * * * *